United States Patent [19]

Burgdorf

[11] Patent Number: 4,749,240
[45] Date of Patent: Jun. 7, 1988

[54] SLIP-CONTROLLED BRAKE SYSTEM

[75] Inventor: Jochen Burgdorf, Offenbach-Rumpenheim, Fed. Rep. of Germany

[73] Assignee: Alfred Teves GmbH, Frankfurt Am Main, Fed. Rep. of Germany

[21] Appl. No.: 937,226

[22] Filed: Dec. 3, 1986

[30] Foreign Application Priority Data

Dec. 3, 1985 [DE] Fed. Rep. of Germany ....... 3542601

[51] Int. Cl.$^4$ .......................... B60T 8/44; B60T 13/00
[52] U.S. Cl. .................................... 303/114; 303/113; 60/547.1
[58] Field of Search ................. 303/92, 113, 114, 115, 303/116, 119; 188/181 A; 60/547.1, 578, 591

[56] References Cited

U.S. PATENT DOCUMENTS

| 4,600,243 | 7/1986 | Belart et al. | 303/116 X |
| 4,641,895 | 2/1987 | Belart et al. | 303/119 |
| 4,645,272 | 2/1987 | Leiber | 303/119 |

FOREIGN PATENT DOCUMENTS 3507484  9/1986  Fed. Rep. of Germany .

*Primary Examiner*—Andres Kashnikow
*Assistant Examiner*—Timothy E. Newholm
*Attorney, Agent, or Firm*—James B. Raden; Robert P. Seitter

[57] ABSTRACT

A slip-controlled brake system for automotive vehicles including provision of a static brake circuit into which pressure fluid out of a dynamic pressure fluid circuit can be introduced during slip control via a multi-directional control valve. The master cylinder assembly connected for this purpose to a hydraulic brake power booster comprises a partition or floating piston designed as a stepped piston and isolating the two working chambers of the master cylinder. The large step of the floating piston is sealingly guided in the master cylinder bore, the working chamber in front of the large step communicating by way of a pressure fluid conduit with the booster chamber and with the brake circuit of the wheel brakes of the rear wheels. In the event of failure of the brake power booster, a return flow of the pressure fluid out of the working chamber of the large step of the floating piston by way of the booster chamber is precluded, since a non-return valve is inserted into the supply line so that in this instance the brake circuit additionally acts as a static brake circuit.

4 Claims, 1 Drawing Sheet

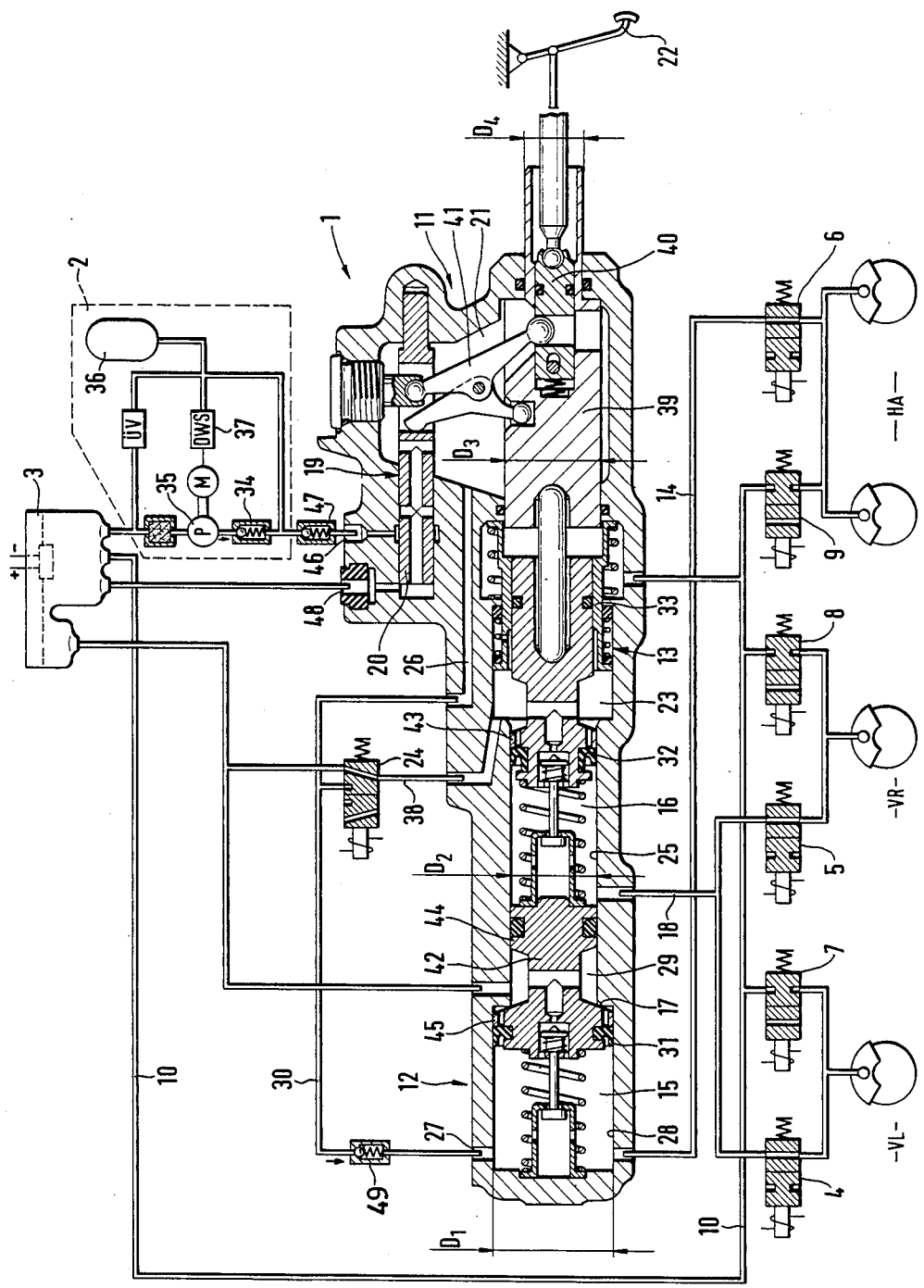

SLIP-CONTROLLED BRAKE SYSTEM

BACKGROUND OF THE INVENTION

The present invention relates to a slip-controlled brake system for automotive vehicles with at least one static brake circuit into which pressure fluid out of a dynamic pressure fluid circuit can be introduced during slip control. The system includes a brake pressure generator comprising a master cylinder assembly and a hydraulic brake power booster with a control valve and with a booster piston which is adapted to be coupled with the brake pedal. At least one dynamic brake circuit is connected to the booster chamber.

Known multi-circuit brake systems operating according to the principle of dynamic flow-in into a brake circuit, and wherein the dynamic pressure corresponds to the pressure acting as well on the hydraulic booster piston, are disadvantageous in that in the event of a failure of this specific circuit, both the boosting effect and the braking effect of this circuit are lost.

In addition, brake systems have been proposed German printed and published patent application No. 3507484 which comprise a pedal-actuated brake power booster connected to the master cylinder. The booster being provided with a booster piston and a booster chamber, wherein an auxiliary pressure which is proportional to the pedal effort is generated by way of a brake valve. These systems are equipped with a fast-fill cylinder provided with a stepped bore, wherein a two-step piston is displaceably arranged, a pressure chamber is provided in front of the large step of the two-step piston and a filling chamber is provided in front of the small step. In this case, the pressure chamber is connected to the booster chamber and the filling chamber to a working chamber of the master cylinder, a non-return valve is inserted into the communicating conduit connecting the booster chamber with the pressure chamber of the fast-fill cylinder, and the control slide of the brake valve cooperates with a valve body through the intermediary of which the brake valve is connected to the pressure chamber. This known brake system is disadvantageous in that it requires a relatively large installation space since the fast-fill cylinder is designed as an additional separate unit.

The present invention has as an object to create a brake system of the type described, wherein in the event of a failure of the auxiliary pressure source a brake pressure can still be built up in the dynamic brake circuit connected to the hydraulic booster by means of the pedal effort so that the brakability of all wheel brakes will be maintained. The brake system should have a particularly simple design, should operate without complicated additional parts, and should be designed such that existing brake systems can be retrofitted with a hydraulic booster.

SUMMARY OF THE INVENTION

According to the invention, this object is achieved in that two working chambers of the master cylinder assembly are separated from each other by means of a partition and/or floating piston designed as a stepped piston. The small step of the stepped piston is sealingly guided in the master cylinder bore for the first master cylinder and/or push rod piston, which is adapted to be coupled with the brake pedal, and the larger step in a master cylinder bore forming a working chamber which is connected directly to the booster chamber via a pressure fluid conduit and to the dynamic brake circuit. A filling chamber, for example an annular chamber, behind the push rod piston being, by way of a pressure conduit into which a multi-directional control valve is interposed, connectible both to the storage and pressure compensating reservoir and to the pressure conduit communicating with the booster chamber.

A non-return valve is expediently inserted into the supply line from the auxiliary pressure source to the control valve of the hydraulic brake power booster or into the control valve proper, which non-return valve precludes a return flow of the pressure fluid out of the booster chamber to the auxiliary pressure source.

The brake pedal acts, advantageously, by way of a pressure member, for example by way of a piston rod, onto the booster piston which, for its part, is coupled with the first master cylinder piston, a linkage, for example a lever linkage, being interposed between the piston rod and the booster piston. The lever linkage permits a relative displacement between the piston rod and the booster piston, but, in the event of a failure of the brake power booster the piston rod contacts and directly transfers a brake pedal force to the booster piston.

In a preferred embodiment, a further non-return valve is inserted into the pressure fluid conduit from the booster chamber to the working chamber in front of the second master cylinder piston designed as a stepped piston, which valve precludes a return flow of the pressure fluid out of the working chamber into the booster chamber in the event that the pressure in the booster chamber drops below a set value.

When the booster is working properly, only the front axle will be supplied out of the pressure circuit due to the stepped partition or floating piston pressurized by the booster pressure, whereas the rear axle will be supplied dynamically out of the booster, the floating piston remaining at its housing stop. In the event of a failure of the booster, the floating piston chamber will be separated from the accumulator and/or from the auxiliary pressure source by means of a non-return valve, the pressure circuit actuating the floating piston and thus supplying the rear axle brakes with static pressure. In the event of a booster failure, and with the pedal effort being the same, the deceleration will increase as against a system with a purely dynamic rear axle, whereas the pedal travel will increase at the same time by the absorption volume of the rear axle circuit.

BRIEF DESCRIPTION OF THE DRAWING

Other features, advantages and applications of the present invention will become apparent from the following description of an embodiment of the present invention taken in connection with the accompanying drawing wherein the single figure illustrates a brake system in accordance with the present invention.

DETAILED DESCRIPTION

According to the drawing, the brake system as specified in the invention comprises a pedal-actuated long-stretched hydraulic brake pressure generator which is marked in its entirety by the reference numeral 1, an auxiliary pressure source 2, a storage and pressure compensating reservoir 3 and electromagnetically actuatable two-way/two-position valves 4 to 6 through the intermediary of which the wheel brakes and/or the front and rear wheel VR, VL, HR and HL are connected to two hydraulically separate brake circuits. Normally, that is as long as they are not energized, the valves 4 to 6 are switched so as to be open. In addition, a return conduit 10 leading from the front and from the rear wheels VR, VL, HR, HL to the compensating reservoir 3 is provided, which return conduit is, however, separated from the wheel brake cylinders by means of three additional two-way/two-position valves 7 to 9 as long as the valves 7 to 9 are not energized.

The brake pressure generator 1, in turn, is composed of a hydraulic brake power booster 11 and of a master cylinder assembly 12 as well as of a positioning device 13.

A brake circuit, namely the rear wheel brake circuit 14, is connected to the brake power booster 11 through the intermediary of the working chamber 15 of the master cylinder assembly 12, whereas the working chamber 16 of the master cylinder assembly 12 which is, in this construction, shaped in the form of a tandem master cylinder, is connected with the front wheels VR and/or VL via an individual brake circuit 18. The master cylinder circuit 18 of such an assembly is referred to as static pressure fluid circuit, the rear axle circuit 14 as dynamic pressure fluid circuit since in this circuit 14 the pressure is determined by means of the position of a, via a lever linkage 41, pedal-actuated control valve 19 which, depending on the displacement of a valve piston 20, allows for a higher or lower inflow of pressure from the auxiliary pressure source 2 into the booster chamber 21 and from there via the pressure conduits 26, 30 and the working chamber 15 into the brake circuit 14.

The pressure which is being built up in the booster chamber 21 and/or which is introduced by means of the control valve 19 when a brake pedal 22 is actuated, simultaneously acts upon the first or push rod piston 43 of the master cylinder assembly 12 and results, as is easily understandable, in a build-up of braking pressure in the working chamber 16 of the static brake circuit 18 leading to the front wheels VR and VL. Due to the fact that the partition and/or floating piston 42 has a larger effective cross-section than the push rod piston 43, the master cylinder piston 42 remains at its stop 17 at the master cylinder housing when the booster 11 is operating properly. At first, atmospheric pressure prevails in an annular chamber 23 of the master cylinder assembly 12 because this chamber 23 communicates in the inoperative position, in which the valve is not energized, with the pressure compensating reservoir 3 via a so-called main valve 24.

Each wheel VL, VR, HL, HR of the vehicle equipped with the brake system according to the invention is provided with a sensor which is, for instance, shaped in the form of an inductive transducer and which feeds the information about the rotating behaviour of the wheel into an electronic controller (not shown). This controller comprises, among other things, an electronic logical operation circuit in the form of wired or programmable switching circuits such as microprocessors and generates, after the evaluation of the sensor signals, control commands which are available at the outlets of the controller and which are further transmitted to the respective solenoid valves 4 to 9 and 24 by way of signalling lines (not shown).

When the brake slip control sets in, the main valve 24 is switched over. Thereby, a pressure fluid conduit 26, 30, 38 leading from the booster chamber 21 to the prechamber 23 is released, thus allowing a pressure fluid to flow into the annular chamber 23, wherefrom the pressure fluid is dynamically fed, through the intermediary of a cup seal 32 arranged at the circumference of the piston 43 and performing the function of a non-return valve, into the working chamber 16 which communicates with the wheel brakes of the front wheels VL, VR.

Since the pressure conduit 30 is also connected to the working chamber 15 of the large step of the partition or floating piston 42 via the housing connection 27, a controlled pressure, that is a pressure which is identical to that prevailing in the booster chamber 21, exists in the working chamber 15 and in the rear wheel brake circuit 14 connected thereto.

The dynamically introduced pressure leads, at the same time, to a reset of a positioning sleeve 33 of the positioning device 13, the piston 43 thus taking a defined position in the master cylinder assembly 12.

Due to the dynamic introduction of pressure fluid into the static brake circuit 18 of the front wheels VR, VL and into the annular chamber 23, which introduction is of importance for the resetting pressure acting on the positioning sleeve 33, an "empty control" of the working chamber 16 is precluded even in the event of a frequent reduction due to the discharge of pressure fluid via the valves 7 and 8 which have been switched over.

In the event of a defect occuring in the auxiliary energy supply system 2 comprising, substantially, a pressure fluid pump 35 with the associated non-return valve 34 and a pressure fluid accumulator 36, the pressure warning circuit (DWS) 37 responds, transmits this information to the electronic controller of the brake system and causes, depending on the amount of the residual pressure, a cut-off of the brake slip control.

Defects in the dynamic pressure fluid conduit within the brake pressure generator 1, e.g. a defect in the booster chamber 21 or in the conduit 26 or a leaky main valve 24, can be detected by measuring the travel or determining the position of the positioning sleeve 33. Namely, if a leakage or a defect in the pressure fluid conduit 26, 30, 38 prevents the introduction of dynamic pressure into the annular chamber 23, this will lead during the brake slip control to a reduction in the volume in the working chamber 16 and to a considerable displacement of the positioning sleeve 33 to the left, relative to the drawing, as a result whereof a switch, is finally actuated—when the remaining pressure fluid volume in the front wheel circuits becomes too small. The switch opens the signalling line from a source to an inlet of the electronic controller which causes a partial or total cut-off of the brake system.

In the event of a failure of the energy supply 2, for example, due to a lack of electric voltage at the pump motor 35, a pump defect or a line rupture, the return channel 46 is closed by way of the control valve 19 and the piston rod 40 is connected mechanically with the booster piston 39 on pedal acutation. Also, in the event that pressure in the booster chamber 21 fails, a non-return valve 49 prevents a return flow of pressure fluid from the working chamber 15 into the booster chamber.

When the booster piston 39 is further moved, a pressure is being built up in the brake circuits 14, 18 upon displacement of the master cylinder piston 42, 43, another non-return valve 47 preventing, in this case, that the switching means, hoses and accumulators absorb pressure fluid from the booster chamber 21.

When assigning corresponding areas of cross-section $F_1$ to $F_4$ to the diameters $D_1$, $D_2$, $D_3$ and $D_4$, the ratio should, preferably, be as follows:

$$F_1 = F_2 + (F_3 - F_4)$$

What is claimed is:

1. Slip-controlled brake system for automotive vehicles with brake cylinders associated with at least one front and one rear wheel and with at least one static brake circuit connected to one of the at least one front and one rear brake cylinders and into which pressure fluid out of a dynamic pressure fluid circuit can be introduced during slip control, and with a brake pressure generator comprising a master cylinder assembly and a hydraulic brake power booster with a booster pressure control valve and with a booster piston which is adapted to be coupled with the brake pedal, at least one dynamic brake circuit being connected to a booster chamber and to the other of the at least one front and one rear brake cylinders, wherein two working chambers of the master cylinder assembly are separated from each other by means of a floating piston designed as a stepped piston, the smaller step of the stepped piston being sealingly guided in a master cylinder bore for a first master cylinder piston, which is adapted to be coupled with the brake pedal, and the larger step of the stepped piston being sealingly guided in a master cylinder bore and forming a working chamber which is connected directly to the booster chamber by way of a pressure fluid conduit and to the dynamic brake circuit, and further comprising a filling chamber which includes an annular chamber located behind the first master cylinder piston; wherein said annular chamber is connected by a conduit to a multi-directional control valve which, in in one position, connects said annular chamber to a compensating reservoir and which, in another position, connects said annular chamber to the pressure conduit communicating with the booster chamber.

2. Slip-controlled brake system according to claim 1, wherein a non-return valve is inserted into the supply line from an auxiliary pressure source to the booster pressure control valve of the hydraulic brake power booster, which non-return valve precludes a return flow of the pressure fluid out of the booster chamber to the auxiliary pressure source.

3. Slip-controlled brake system according to claim 2, wherein the brake pedal acts by way of a pressure member, including a piston rod, on the booster piston which is coupled with the first master cylinder piston, a linkage, including a lever linkage, being interposed between the piston rod and the booster piston and actuating the booster pressure control valve, said lever linkage permitting a relative displacement between the piston rod and the booster piston, but, in the event of a failure of the brake power booster, the piston rod contacting and directly transfering a brake pedal force to the booster piston.

4. Slip-controlled brake system according to claim 3, wherein a second non-return valve is inserted into the pressure fluid conduit from the booster chamber to the working chamber in front of the floating piston designed as a stepped piston, which second non-return valve precludes a return flow of the pressure fluid out of the working chamber into the booster chamber in the event that the pressure in the booster chamber drops below a set value.

* * * * *